US012585016B2

(12) United States Patent (10) Patent No.: US 12,585,016 B2

Revadigar et al. (45) Date of Patent: Mar. 24, 2026

(54) INTRUSION DETECTION METHOD AND APPARATUS

(71) Applicant: Shenzhen Yinwang Intelligent Technologies Co., Ltd., Shenzhen (CN)

(72) Inventors: Girish Shivalingappa Revadigar, Singapore (SG); Suk In Kang, Singapore (SG); Zhuo Wei, Singapore (SG); Seonghoon Jeong, Seoul (KR); Hyunjae Kang, Seoul (KR); Huy Kang Kim, Seoul (KR); Hyun Min Song, Seoul (KR)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 18/587,159

(22) Filed: Feb. 26, 2024

(65) Prior Publication Data

US 2025/0044449 A1 Feb. 6, 2025

Related U.S. Application Data

(63) Continuation of application No. PCT/CN2021/114574, filed on Aug. 25, 2021.

(51) Int. Cl.
*G01S 17/88* (2006.01)
*G01S 17/04* (2020.01)
*G06N 3/092* (2023.01)

(52) U.S. Cl.
CPC .............. *G01S 17/88* (2013.01); *G01S 17/04* (2020.01); *G06N 3/092* (2023.01)

(58) Field of Classification Search
CPC .......... G01S 17/88; G01S 17/89; G01S 17/04; G01S 7/495; G01S 17/10; G01S 17/931; G01S 7/4802; G06N 3/092
See application file for complete search history.

(56) References Cited

U.S. PATENT DOCUMENTS

| | | | |
|---|---|---|---|
| 10,249,109 B1 | 4/2019 | Konrardy et al. | |
| 10,401,866 B2 | 9/2019 | Rust | |
| 10,634,793 B1 * | 4/2020 | Siao ....................... | G06V 10/80 |

(Continued)

FOREIGN PATENT DOCUMENTS

| | | | | |
|---|---|---|---|---|
| WO | WO-2021012987 A1 * | 1/2021 | .......... | G01S 15/931 |
| WO | 2021108814 A2 | 6/2021 | | |

OTHER PUBLICATIONS

Yulong Cao et al, "Adversarial Sensor Attack on LiDAR-based Perception in Autonomous Driving," Proceedings of the 2019 ACM SIGSAC conference on computer and communications security, Nov. 11-15, 2019, total 15 pages.

(Continued)

*Primary Examiner* — Adnan Aziz

(74) *Attorney, Agent, or Firm* — Conley Rose, P.C.

(57) ABSTRACT

An intrusion detection method includes obtaining a first point cloud from a light detection and ranging (LiDAR) sensor, obtaining a first object information by applying a first perception process to the first point cloud, modifying the first point cloud to obtain a second point cloud, obtaining a second object information by applying a second perception process to the second point cloud, and providing an intrusion result based on a comparison between the first object information and the second object information.

19 Claims, 5 Drawing Sheets

400

Obtain a first point cloud from a LiDAR sensor — S410

Obtain a first object information by applying a first perception process on the first point cloud — S420

Modify the first point cloud to obtain a second point cloud — S430

Obtain a second object information by applying a second perception process on the second point cloud — S440

Provide intrusion result based on a comparison between the first object information and the second object information — S450

(56) References Cited

U.S. PATENT DOCUMENTS

| | | | |
|---|---|---|---|
| 10,650,531 | B2 | 5/2020 | Lakshmi Narayanan et al. |
| 10,677,900 | B2 | 6/2020 | Russell et al. |
| 11,221,399 | B2 | 1/2022 | Kunz et al. |
| 11,430,182 | B1 * | 8/2022 | Yang ........................ G06T 19/20 |
| 11,726,184 | B2 * | 8/2023 | Ferreira ................ G01S 17/894 |
| | | | 356/4.01 |
| 2003/0190586 | A1 | 10/2003 | Falk et al. |
| 2004/0183281 | A1 | 9/2004 | Stopczynski |
| 2018/0188359 | A1 | 7/2018 | Droz et al. |
| 2019/0129014 | A1 * | 5/2019 | Merritt .................... G01S 7/003 |
| 2020/0126208 | A1 | 4/2020 | Ponto et al. |
| 2021/0303922 | A1 * | 9/2021 | Tu .......................... G01S 17/894 |
| 2022/0126864 | A1 * | 4/2022 | Moustafa .............. B60W 50/14 |
| 2022/0268904 | A1 * | 8/2022 | Zhao ......................... G01S 7/40 |
| 2023/0243919 | A1 * | 8/2023 | Day ...................... G01S 7/4873 |
| | | | 356/4.01 |

OTHER PUBLICATIONS

Hocheol Shin et al, "Illusion and Dazzle: Adversarial Optical Channel Exploits against Lidars for Automotive Applications," International Conference on Cryptographic Hardware and Embedded Systems. Springer, Cham, 2017, total 21 pages.

James Tu et al, "Physically Realizable Adversarial Examples for LiDAR Object Detection," 2020 IEEE/CVF Conference on Computer Vision and Pattern Recognition (CVPR), total 10 pages.

Jonathan Petit et al, "Remote Attacks on Automated Vehicles Sensors: Experiments on Camera and LiDAR," 2015, total 13 pages.

* cited by examiner

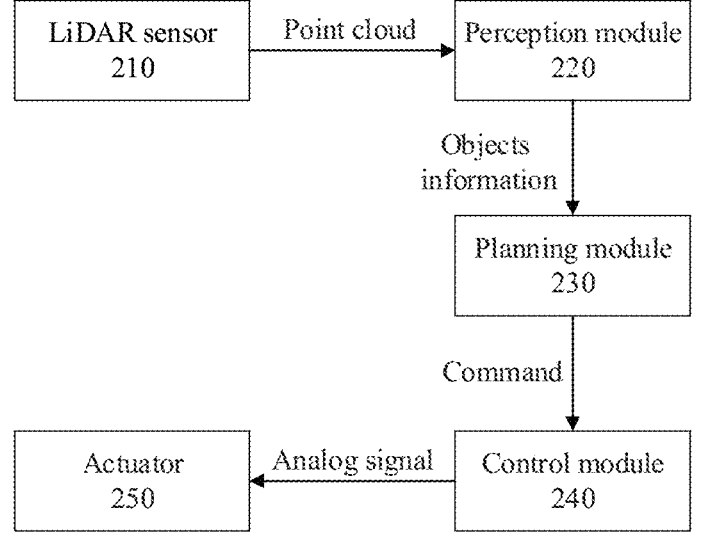
FIG. 1
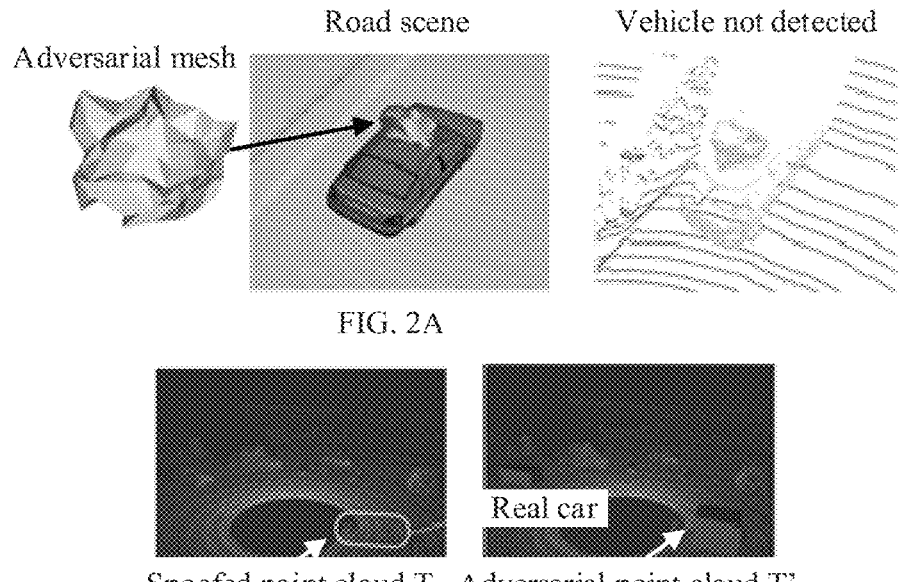
Road scene
Vehicle not detected
Adversarial mesh
FIG. 2A
Real car
Spoofed point cloud T    Adversarial point cloud T"
FIG. 2B

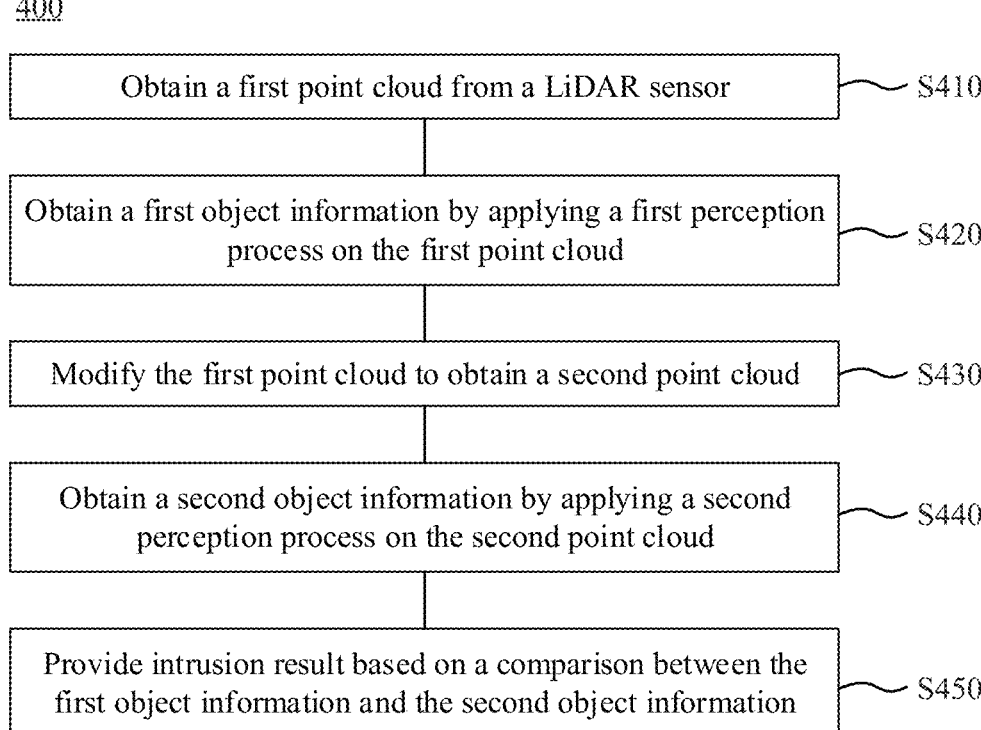

400

Obtain a first point cloud from a LiDAR sensor — S410

Obtain a first object information by applying a first perception process on the first point cloud — S420

Modify the first point cloud to obtain a second point cloud — S430

Obtain a second object information by applying a second perception process on the second point cloud — S440

Provide intrusion result based on a comparison between the first object information and the second object information — S450

FIG. 4

INTRUSION DETECTION METHOD AND APPARATUS

CROSS-REFERENCE TO RELATED APPLICATIONS

This is a continuation of International Patent Application No. PCT/CN2021/114574 filed on Aug. 25, 2021, the disclosure of which is hereby incorporated by reference in its entirety.

TECHNICAL FIELD

The present disclosure generally relates to the field of object detection, and in particular, to an intrusion detection method and apparatus.

BACKGROUND

A light detection and ranging (LiDAR) sensor plays a crucial role in many fields. For example, in the field of autonomous driving, the LiDAR sensor recognizes the surrounding vehicles or obstacles to secure the vehicle's safety while the LiDAR sensor embedded vehicle is driving.

The LiDAR sensor has vulnerabilities that could be performable physically due to the technologies' characteristics. The LiDAR sensor recognizes the surrounding objects by transmitting infrared (IR) pulse signal and receiving the IR pulse signal reflected by the surrounding objects. The IR pulse signal received by LiDAR sensor could be a replicated IR pulse signal provided by an attacker. As a result, the attacked signal would lead to a false recognition for the surrounding objects.

Various intrusion detection methods have been proposed. In some implementations, a previous frame and the current frame are compared to detect an abnormality. Most normal objects could be represented similarly in almost all frames and the attacker's anomaly data could exist in some frames. However, since the variability of information between two consecutive frames is large during driving, the result of anomaly detection could be not accurate. In other implementations, the recognized object's shape is compared with the target object's expected shape in the ground truth database to detect an abnormality. When the correlation value of the target object's expected shape and recognized object's shape is outside of a threshold, the object is determined to be abnormal. However, it is difficult to construct all ground truth that exist in the world, which means a brute-force method is inefficient practically.

SUMMARY

Embodiments of this disclosure provide an intrusion detection method and apparatus.

According to a first aspect, an intrusion detection method is provided. The intrusion detection method includes obtaining a first point cloud from a LiDAR sensor, obtaining a first object information by applying a first perception process to the first point cloud, modifying the first point cloud to obtain a second point cloud, obtaining a second object information by applying a second perception process to the second point cloud, and providing an intrusion result based on a comparison between the first object information and the second object information.

In the technical solutions provided by the present disclosure, the adversarial attack could be identified by comparing the original object information and the modified object information. In other words, the abnormal of the point cloud due to the attacker could be identified. Therefore, the method in this embodiment could improve the reliability of object detection and is beneficial to provide more accurate perception results for subsequent control strategies.

In addition, the technical solutions provided by the present disclosure could detect the intrusion in the unit of object point cloud instead of each point. In other words, the technical solutions could work on each object region one by one, instead of detecting the entire point cloud. The technical solutions targets object regions, so that it is faster than analyzing the whole points on the scene.

For example, the first point cloud belongs to the raw point cloud from the LiDAR sensor. The first point cloud includes a set of point cloud of an object. In other words, the object can be recognized by perceiving the first point cloud.

For example, an object information includes at least one of the following: the location of the object (x, y, z), the volume (width, height, length) of the object, or the objectiveness score.

The first object information can be identified object information, or uncertain object information. Identified object information refers to an object information with high confidence score. Uncertain object information refers to an object information with low confidence score.

Optionally, modifying the first point cloud to obtain a second point cloud includes randomly modifying the first point cloud to obtain the second point cloud.

In one optional implementation, the first perception process and the second perception process use the same perception algorithm.

In this way, no additional perception algorithm is required, which reduces the need for storage space, that is, there is no need to provide additional storage space for other perception algorithms.

In one optional implementation, modifying the first point cloud to obtain a second point cloud includes at least one of adding one or more points to the first point cloud, or removing one or more points from the first point cloud.

It should be noted that the operation of modifying the first point cloud to the second point cloud may include one or more modifications.

In one optional implementation, modifying the first point cloud to obtain a second point cloud includes selecting an action from the following: adding, removing, a combination of removing and adding, a combination of resetting and adding, a combination of resetting and removing, or a combination of resetting, adding and removing; locating one or more points that would be performed the action and performing the selected action on the one or more points.

Optionally, selecting an action from the following includes selecting an action by deep reinforcement learning.

In this way, the action and the location can be determined separately, which is conducive to obtaining a more appropriate modification, so that the detection result can be obtained as soon as possible.

In one optional implementation, the method further includes locating the one or more points by deep reinforcement learning.

In one optional implementation, providing an intrusion result based on a comparison between the first object information and the second object information includes classifying the first object information as an intrusion when the comparison between the first object information and the second object information is equal to or more than a first threshold.

In one optional implementation, the method further includes at least one of dropping the first object information, or forwarding a corrected object information to a planning module, wherein the corrected object information is obtained based on the second object information.

Forwarding a corrected object information can be regarded as a form of alerting of the intrusion.

For example, when the object corresponding to the first information is an object added by the attacker, drop the first object information.

For example, when the object corresponding to the first information is an object removed by the attacker, provide the corrected object information to the planning module.

The corrected object information can be the second object information.

When the method is applied to the autonomous driving system, the safety of the driving and the user experience could be improved. For example, when the object that should have been recognized is hidden by an attacker, the technical solutions provided by the present disclosure could recognize the hidden object and alert of the intrusion to avoid incidents, including a car accident. For example, when the object that should have not been recognized is created by an attacker, technical solutions provided by the present disclosure could recognize the object created and drop the object information to avoid freezing a vehicle or triggering an emergency brake.

In one optional implementation, providing an intrusion result based on a comparison between the first object information and the second object information includes classifying the first object information as benign when the comparison between the first object information and the second object information is less than the first threshold.

In one optional implementation, the method further includes forwarding the first object information to a planning module.

In this way, the object information classified as a benign would be passed to the planning module, which is conducive to the planning module to make correct decisions.

According to a second aspect, an intrusion detection apparatus is provided. The intrusion detection apparatus includes an obtaining unit configured to: obtain a first point cloud from a LiDAR sensor and obtain a first object information by applying a first perception process to the first point cloud, and a processing unit configured to modify the first point cloud to obtain a second point cloud, wherein the obtaining unit is further configured to obtain a second object information by applying a second perception process to the second point cloud, and the processing unit is further configured to provide an intrusion result based on a comparison between the first object information and the second object information.

In the technical solutions provided by the embodiments of the present application, the adversarial attack could be identified by comparing the original object information and the modified object information. In other words, the abnormality of the point cloud due to the attacker could be identified. Therefore, the apparatus in this embodiment could improve the reliability of object detection and is beneficial to provide more accurate perception results for subsequent control strategies.

In addition, the technical solutions provided by the present disclosure could detect the intrusion in the unit of object point cloud instead of each point. In other words, the technical solutions could work on each object region one by one, instead of detecting the entire point cloud. The technical solutions target object regions, so that it is faster than analyzing the whole points on the scene.

In one optional implementation, the processing unit is configured to add one or more points to the first point cloud, or remove one or more points from the first point cloud.

In one optional implementation, the processing unit is further configured to locate the one or more points by deep reinforcement learning.

In one optional implementation, the processing unit is configured to: classify the first object information as an intrusion when the comparison between the first object information and the second object information is equal to or more than a first threshold.

In one optional implementation, the processing unit is further configured to perform at least one of dropping the first object information, or forwarding a corrected object information to a planning module, wherein the corrected object information is obtained based on the second object information.

In one optional implementation, the processing unit is configured to: classify the first object information as benign when the comparison between the first object information and the second object information is less than the first threshold.

In one optional implementation, the processing unit is further configured to: forward the first object information to a planning module.

According to a third aspect, an intrusion detection apparatus is provided. The intrusion detection device includes a processor and a memory. The memory is configured to store a computer program, and the processor is configured to execute the computer program stored in the memory, and perform the method according to any one of the first aspect or the possible implementations of the first aspect.

According to a fourth aspect, a computer readable storage medium is provided, where the computer readable storage medium stores a computer program. When the computer program is executed by a processor, the method according to any one of the first aspect or the possible implementations of the first aspect is implemented.

According to a fifth aspect, a computer program product that includes an instruction is provided. When the instruction is run on a computer, the computer is enabled to perform the method according to any one of the first aspect or the possible implementations of the first aspect.

According to a sixth aspect, a chip is provided. The chip includes at least one processor and an interface circuit. At least one processor obtains instructions stored in a memory through the interface circuit, and performs the method according to any one of the first aspect or the possible implementations of the first aspect.

Optionally, the chip may further include a memory in which instructions are stored, and the processor is configured to execute instructions stored on the memory. When the instructions are executed, the processor is configured to perform the method according to any one of the first aspect or the possible implementations of the first aspect.

According to a seventh aspect, a terminal is provided. The terminal includes the intrusion detection apparatus according to any one of the second aspect or the possible implementations of the second aspect.

For example, the terminal can be a vehicle, a robot, or an unmanned aerial vehicle.

In one optional implementation, the terminal includes a LiDAR sensor.

BRIEF DESCRIPTION OF DRAWINGS

FIG. 1 is a schematic diagram of a vehicle control process;

FIG. 2A is a schematic diagram of a point cloud level attack;

FIG. 2B is a schematic diagram of another point cloud level attack;

FIG. 4 is a schematic diagram of an intrusion detection method according to an embodiment;

DESCRIPTION OF EMBODIMENTS

Figure 3:
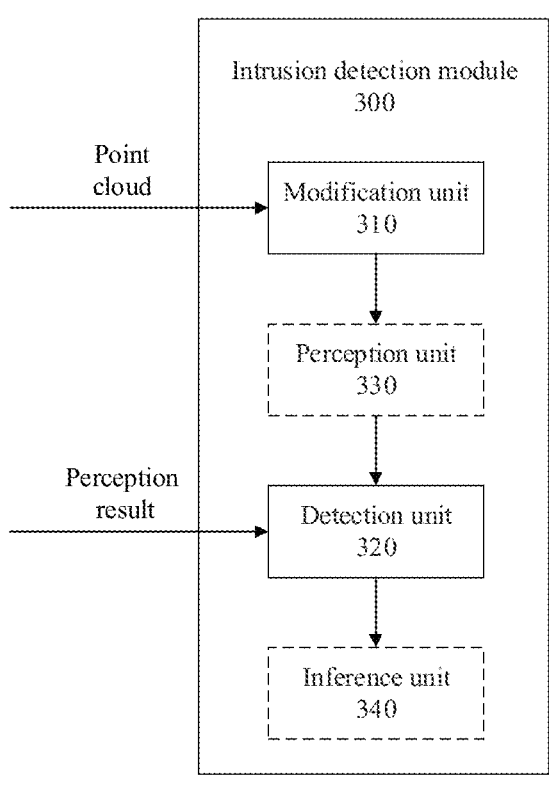
FIG. 3 is a schematic block diagram of an intrusion detection module according to an embodiment.

The technical solutions of this disclosure are further described in detail with reference to the accompanying drawings and embodiments as follows.

The technical solutions of this disclosure can be applied to the field in which the intrusion detection is needed, such as autonomous driving, robot navigation, unmanned aerial vehicle navigation and virtual/augmented reality. The following mainly describes the scenes of automatic driving.

FIG. 1 depicts a data flow that is required to perceive the surroundings, make plan, and control a vehicle. In some embodiments, the vehicle is configured to be fully or partially autonomous. The vehicle relies on various sensors and perception to recognize the near environment, analyze the driving context, and make decisions.

As shown in FIG. 1, an autonomous vehicle includes sensors, perception module 220, planning module 230, control module 240 and actuator 250. One of the primary sensors used in the car is a LiDAR sensor 210. A LiDAR sensor recognizes the surrounding vehicles or obstacles to secure the vehicle's safety while the LiDAR sensor embedded vehicle is driving.

A LiDAR sensor measures the distance, speed, direction, and various characteristics of the object using the IR pulse signal. Moreover, the LiDAR sensor recognizes the object in the environment.

In further detail, the LiDAR sensor transmits the IR pulse signal to surrounding objects. The surrounding objects reflect the IR pulse signal from the LiDAR sensor, and the reflected IR pulse signal returns to the receiver in the LiDAR sensor. The point cloud can be obtained from the reflected IR pulse signal.

As shown in FIG. 1, the perception module 220 apply the perception process to the point cloud to obtain the information of the objects, such as the location of an object (x, y, z), the volume (width, height, length), and the objectiveness score. Then the planning module 230 develops the control strategy according to the object information. For example, the planning module 230 develops the control strategy to avoid or otherwise circumvent potential obstacles in the vehicle's environment. For another example, the planning module 230 develops the control strategy to determine the driving path. Then the control module 240 sends analog signal to the actuator 250 according to the command from the planning module 230.

The accuracy of the object information is important to the control strategy of the planning module 230 while driving.

However, the principle of the LiDAR sensor could be used by the attackers to cause false recognition for the surrounding objects. For example, the IR pulse signal received by the LiDAR sensor might be an attacked signal due to the no consideration of the attack threats. As a result, the point cloud data based on the attacked signal would be an attacked point cloud data, which causes false recognition for the surrounding objects.

In other words, an attacker could inject or modify the point cloud to lead to fake perception results, such as hiding existing objects or placing fake objects.

FIGS. 2A and 2B show two examples of such attacks. As shown in FIG. 2A, in the road scene, when an adversarial mesh is put on a surrounding vehicle, the perception module would not recognize the surrounding vehicle. In other words, the surrounding vehicle could not be detected. The attacker could successfully hide a target vehicle by projecting an adversarial mesh on the target vehicle. As shown in FIG. 2B, the attack model could modified the point cloud to hide an object or place an object. For example, the spoofed point cloud T caused by the attacker modifying the real point cloud could cause a real object to be hidden. The adversarial point cloud T' caused by the attacker modifying the real point cloud could cause a spoofed obstacle to be detected. An object hided by the attacker would lead to high severity incidents, including a car accident. A fake object placed by the attacker would freeze a vehicle or trigger an emergency brake.

The modified point cloud might affect the accuracy of the perception result, which would cause abnormal behavior and thus reduce the reliability of the vehicle.

The previous approach to perceive fake objects includes adversarial training of the perception algorithm. It is only possible when various adversarial examples are acquired.

The technical solutions of this disclosure provide intrusion detection to protect the LiDAR sensor embedded vehicle from point cloud modification attacks, namely adversarial attacks. As a result, the reliability of the autonomous driving is improved, which means the safety and the user experience is improved.

One or more of the components in FIG. 1 may be installed or associated with the vehicle separately. The components may be wired and/or wirelessly coupled together in communication.

Optionally, the above components are only an example, and in practice, the components may be added or removed as required, and FIG. 1 should not be construed as a limitation of the embodiment of the disclosure.

An intrusion detection module provided in the present disclosure could be set up in the device embedded with a LiDAR sensor, such as a vehicle, a robot or an unmanned aerial vehicle. It should be understood that the intrusion detection module can be an intrusion detection apparatus.

For example, the intrusion detection module is located between the perception module 220 and the planning module 230 in FIG. 2. The perception module 220 forwards the perception result to the intrusion detection module instead of planning module 230.

The intrusion detection module in the present disclosure could also be called PointWiper.

As shown in the FIG. 3, the intrusion detection module receives the perception result and point cloud.

The perception result includes object information. For example, an object information includes the location of the object (x, y, z), the volume (width, height, length) of the object, or the objectiveness score. The objectiveness score is also called confidence score, which is used to indicate probability of the object being accurately recognized. As shown in FIG. 3, an object information can be expressed as (x, y, z, w, h, l, score . . . ). Among them, x, y and z represent the coordinates of the object. W represents the width of the object. H represents the height of the object. L represents the length of the object. The score represents the objectiveness score of the object.

Optionally, the perception result includes identified object information as well as uncertain object information with low confidence scores. Identified object information could refer to object information with high confidence scores.

For example, the point cloud could be the raw point cloud from the LiDAR sensor 210. The point cloud can be passed to the intrusion detection module via the perception module 220, or the point cloud can be directly passed to the intrusion detection module 300 from the LiDAR sensor 210.

The intrusion detection module 300 includes a modification unit 310 and a detection unit 320.

The modification unit 310 is configured to modify the point cloud of an object from the LiDAR sensor to obtain modified point cloud.

For example, the modification unit 310 is configured to perform at least one of the following: add one or more points to the point cloud or remove one or more points from the point cloud. For specific description, please refer to the method 400 in the following text, which will not be repeated here.

Optionally, the intrusion detection module 300 further includes a perception unit 330. In this case, the perception unit 330 could perceive the modified point cloud.

Alternatively, the intrusion detection module 300 could forward the modified point cloud to other device to obtain the perception result of the modified point cloud. For example, the intrusion detection module 300 could forward the modified point cloud the perception module 220 in FIG. 1. And the perception module 220 could re-perceive the modified point cloud and return the perception result of the modified point cloud.

In some possible embodiments, the perception algorithm adopted to recognize the point cloud from the LiDAR sensor and the perception algorithm adopted to recognize the modified point cloud could be different.

In other alternative embodiments, the perception algorithm adopted to recognize the point cloud from the LiDAR sensor and the perception algorithm adopted to recognize the modified point cloud could be same.

The detection unit 320 is configured to provide an intrusion result based on a comparison between the perception result of the point cloud from the LiDAR sensor and the perception result of the modified point cloud.

In other words, the detection unit 320 is configured to detect whether the object is a benign or an intrusion.

Optionally, the intrusion detection module 300 further includes an inference unit 340.

The inference unit 340 is configured to determine whether a further progress is required or not, which means whether the current modified point cloud need to be further modified.

For example, if no intrusion is detected, inference unit 340 can be informed, and the inference unit 340 can determine whether a further progress is required or not. If the inference unit 340 determines a further progress is required, the inference unit 340 could inform the modification unit 310. If the inference unit 340 determines a further progress is not required, that is to say, the object is classified as a benign, the inference unit 340 could provide the point cloud of an object from the LiDAR sensor to other devices, such as the planning module 230 in FIG. 1.

For specific description, please refer to the method 400 in the following text, which will not be repeated here.

FIG. 4 is a schematic view of an intrusion detection method 400 in an embodiment of the present disclosure.

In some possible implements, the method 400 can be applied to an intrusion detection of a LiDAR embedded in an electronic device, such as, vehicle or robot. The method 400 may be executed by an intrusion detection module. For example, the intrusion detection module shown in the FIG. 3 can executed the method 400. That is to say, the method 400 can be applicable between the perception module and the planning module in FIG. 3.

The method 400 includes the following steps.

S410, obtain a first point cloud from a LiDAR sensor.

In some possible implements, step S410 may be executed by the modification unit 310 in FIG. 3.

In some possible implements, the first point cloud belongs to the raw point cloud from the LiDAR sensor, which means the first point cloud is original point cloud.

The first point cloud includes a set of point cloud of an object. In other words, the object can be recognized by perceiving the first point cloud.

The embodiment of the present disclosure only uses one object as an example to illustrate the intrusion detection method. It should be understood that the intrusion detection for other objects on the scene can also be implemented using the same method, which means for each object, method 400 can be used to detect whether an attacker intentionally modifies the object or not.

S420, obtain a first object information by applying a first perception process to the first point cloud.

In some possible implements, step S420 may be executed by the detection unit 320 in FIG. 3. In this case, the first perception process may be executed by the perception module 220 in FIG. 3.

For example, the perception module 220 apply a perception process to the raw point cloud from the LiDAR sensor to get object information. The raw point cloud include the first point cloud. The object information includes the first object information. The object information obtained by perceiving the raw point cloud can be referred to as the original object information. The first object information can be regarded as an original information, For example, an object information includes at least one of the following: the location of the object (x, y, z), the volume (width, height, length) of the object, or the objectiveness score. The objectiveness score is also called confidence score, which is used to indicate probability of the object being accurately recognized by the perception process. As shown in FIG. 3, an object information can be expressed as (x, y, z, w, h, l, score . . . ).

The first object information can be identified object information, or uncertain object information. Identified object information refers to an object information with high confidence score. Uncertain object information refers to an object information with low confidence score.

By processing the uncertain object information, that is to say, the uncertain object information is used as the first point cloud information, so that the undetected objects would not be missed after the attacker modifies the point cloud.

S430, modify the first point cloud to obtain a second point cloud.

In some possible implements, step S430 may be executed by the modification unit 310 in FIG. 3.

For convenience of clear description of the technical solutions in the embodiments of this disclosure, in the embodiments of this disclosure, words such as "first", "second", and the like are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference.

For example, "first point cloud" and "second point cloud" are only used to distinguish the point cloud of an object before modification and the point cloud of an object after modification. In some possible implements, the first point cloud can be understood as the original point cloud of an object. The original point cloud of an object belongs to the raw point cloud from the LiDAR sensor. The second point cloud can be understood as the current modified point cloud of the same object.

It should be understood that modifying the point cloud of an object can be also called modifying the object. In other words, the modified point cloud can be also called modified object.

Optionally, step S430 includes at least one of the following: adding one or more points to the first point cloud, or removing one or more points from the first point cloud.

In other words, the points that are subject to be removed or need to be created is calculated in the step S430.

It should be noted that the operation of modifying the first point cloud to the second point cloud may include one or more modifications.

For example, one modification includes step S431 to step S433 (not shown in FIG. 4).

S431, select an action from the following: adding, removing, combination of removing and adding, combination of resetting and adding, combination of resetting and removing, or combination of resetting, adding and removing.

Resetting refers to clearing the one or more previous modifications.

For example, when resetting refers to clearing the last modification, resetting can be understood as restoring the current point cloud to the point cloud before the last modification.

For example, when resetting refers to clearing all previous modifications, resetting can be understood as restoring the current point cloud to the first point cloud.

In the combination of resetting and other actions, resetting is performed first, and the other actions are performed on the point cloud obtained after the reset.

For example, in the combination of resetting, adding and removing, resetting is performed first, and adding and removing are performed on the point cloud obtained after the reset. Adding and removing may be performed at the same time, or one after the other.

As mentioned earlier, the operation of modifying the first point cloud to the second point cloud may include more modifications. For example, the step S430 can be executed by the modification module. The modification unit knows when to reset the point cloud if the modification does not change the perception result.

S432, locate one or more points that would be performed the action.

In the combination which includes removing and adding, the one or more points that would be added and the one or more points that would be removed may be located separately.

S433, perform the selected action on the one or more points.

It should be understood that S431 to S433 do not limit the execution order of the steps. For example, it can be executed in the order from S431 to S433. Or, it can be executed in the order from S432, S431, and S433. Or, S431 and S432 can be executed at the same time.

In this way, the action and the location can be determined separately, which is conducive to obtaining a more appropriate modification, so that the detection result can be obtained as soon as possible.

In some possible implements, step S430 can be executed by deep reinforcement learning.

Optionally, step S431 includes: select an action by deep reinforcement learning.

Optionally, step S432 includes: locate the one or more points that need to be modified by deep reinforcement learning.

It should also be understood that the steps mentioned above are just examples, and the first point cloud can also be modified in other ways. The embodiment of the disclosure does not limit this. For example, step S430 includes: randomly modify the first point cloud to obtain the second point cloud.

S440, obtain a second object information by applying a second perception process to the second point cloud.

In some possible implements, step S440 may be executed by the detection unit 320 in FIG. 3. In this case, the second perception process may be executed by the perception module 220 in FIG. 3, or perception unit 330 in FIG. 3.

For example, when the second perception process is executed by the perception module 220 in FIG. 3, the intrusion detection module 300 may have an access to the perception progress in the perception module 220.

Optionally, the first perception process and the second perception process use the same perception algorithm.

In this way, no additional perception algorithm is required, which reduces the need for storage space, that is, there is no need to provide additional storage space for other perception algorithms.

S450, provide an intrusion result based on a comparison between the first object information and the second object information.

In some possible implements, step S450 may be executed by the detection unit 320 in FIG. 3.

Optionally, step S450 includes: classify the first object information as an intrusion when the comparison between the first object information and the second object information is equal to or more than a first threshold.

The first object information is classified as an intrusion. It can also be said that the object corresponding to the first object information is an intrusion, which means that the first object point cloud is the point cloud modified by the attacker.

In other words, compared with the object information before the modification, if the object information after the modification has changed a lot, the object can be considered as an intrusion.

Optionally, step S450 includes: classify the first object information a benign when the comparison between the first object information and the second object information is less than a first threshold.

In other words, if the two object informations before and after the modification are similar, the object can be considered as a benign.

The adversarial examples are unstable. Thus, only a slight modification of well-crafted adversarial examples will result in a considerable change in object result, namely object information. In contrast, those benign examples will result in a bit of change. Adversarial examples refer to the point cloud of objects modified by an attacker. Benign examples refer to the point cloud the real point cloud.

Optionally, step S450 includes: when the comparison between the first object information and the second object information is less than the first threshold, modify the second point cloud, and use the modified second point cloud as the second point cloud in the steps S440 to S450, and execute step S440 to S450.

In other words, if the two object information before and after the modification is similar, the current modified point cloud could be further modified.

Optionally, step S450 includes: when the comparison between the first object information and the second object information is less than a first threshold, choose one action from the following: classify the first object information as a benign, or modify the second point cloud, and use the modified second point cloud as the second point cloud in the steps S440 to S450, and execute step S440 to S450.

In other words, if the two object information before and after the modification is similar, step S450 may decide whether a further progress is required or not.

In other words, if no intrusion is detected, that is, if the object is determined not to be an intrusion, step S450 may decide whether a further progress is required or not to the current modified point cloud of the object.

For example, if no intrusion is detected, inference unit 340 can be informed, and the inference unit 340 can determine whether a further progress is required or not, which means whether the current modified point cloud need to be further modified.

For example, step S450 includes: when the comparison between the first object information and the second object information is less than the first threshold, choose one action based on the number of modifications that the current modified point cloud has undergone.

Step S450 may decide that a further progress is required when the number of modifications that the current modified point cloud has undergone is small, and that a further progress is not required when the number of modifications that the current modified point cloud has undergone is large.

For example, step S450 includes: when the comparison between the first object information and the second object information is less than the first threshold, choose one action according to the degree to which the current modified point cloud has been modified.

Step S450 may decide that a further progress is required when the difference between the current modified point cloud and the original point cloud is small, and that a further progress is not required when the difference between the current modified point cloud and the original point cloud is large.

Optionally, step S450 includes: when the comparison between the first object information and the second object information is equal to or more than a first threshold, classify the first object information as an intrusion, when the comparison is equal to or less than a second threshold, classify the first object information as a benign, and when the comparison is more than the second threshold and less than the first threshold, modify the second point cloud, and use the modified second point cloud as the second point cloud in the steps S440 to S450, and execute step S440 to S450.

It should be understood that the position of the above equal sign is only an example. For example, step S450 may also include: classify the first object information as an intrusion when the comparison between the first object information and the second object information is more than a first threshold.

In the specific implementation process, it can be adjusted as needed, which is not limited in the embodiment of the present disclosure.

Optionally, method 400 further includes step S460.

S460, drop the first object information when the first object information is classified as an intrusion.

In some possible implements, step S460 may be executed by the detection unit 320 in FIG. 3.

For example, when the object corresponding to the first information is an object added by the attacker, drop the first object information.

The object added by the attacker refers to an object that actually does not exist in the environment but is recognized by the perception module due to the attacker's modification of the point cloud.

Optionally, method 400 further includes step S470.

S470, alert the intrusion when the first object information is classified as an intrusion.

For example, the detection module 320 can notify the planning module the intrusion.

For example, when the object corresponding to the first information is an object removed by the attacker, provide the corrected object information.

The object removed by the attacker refers to an object that actually exists in the environment but cannot be recognized by the perception module due to the attacker's modification of the point cloud.

The corrected object information can be obtained according to the second object information.

Optionally, method 400 further includes step S480.

S480, forward the first object information to a planning module when the first object information is classified as a benign.

In some possible implements, step S480 may be executed by the detection unit 320 in FIG. 3. Or step S480 may be executed by the inference unit 340 in FIG. 3.

The intrusion detection method provided by the present disclosure can be regarded as a point cloud-level intrusion detection.

In the technical solutions provided by the embodiments of the present disclosure, the adversarial attack could be identified by comparing the original object information and the modified object information. In other words, the abnormal of the point cloud due to the attacker could be identified. Therefore, the method in this embodiment of the present disclosure could improve the reliability of object detection and is beneficial to provide more accurate perception results for subsequent control strategies. For example, when the method 400 is applied to the autonomous driving system, the safety of the driving and the user experience could be improved.

For example, when the object that should have been recognized is hidden by an attacker, the technical solutions provided by the present disclosure could recognize the object hided and alert the intrusion to avoid incidents, including a car accident. For example, when the object that should have not been recognized is created by an attacker, technical solutions provided by the present disclosure could recognize the object created and drop the object information to avoid freezing a vehicle or triggering an emergency brake.

In addition, the technical solutions provided by the present disclosure could detect the intrusion in the unit of object point cloud instead of each point. In other words, the technical solutions could work on each object region one by one, instead of detecting the entire point cloud. The technical solutions targets object regions, so that it is faster than analyzing the whole points on the scene.

Figure 5:
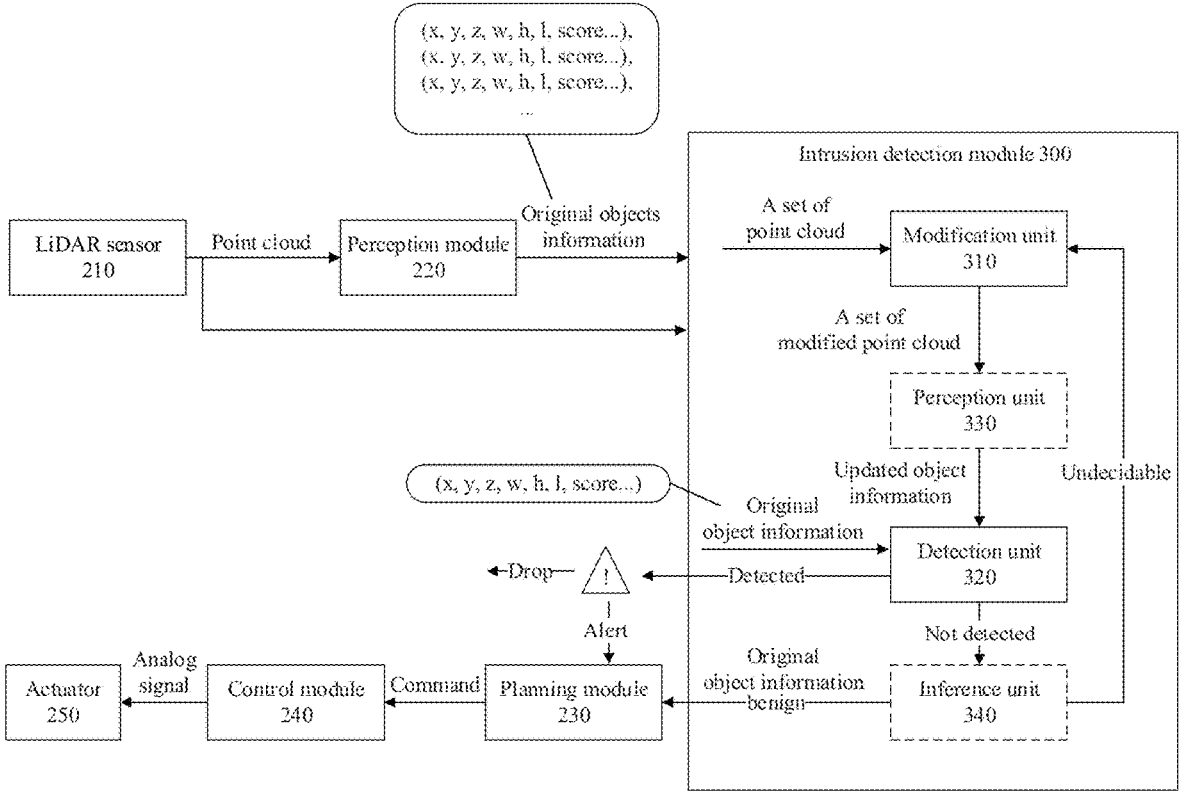
FIG. 5 is a schematic diagram of an intrusion detection method according to another embodiment.

FIG. 5 shows a flowchart of an intrusion detection process provided by an embodiment of the present disclosure applied to the autonomous driving system. The following describes the intrusion detection process corresponding to the foregoing method embodiments. It should be understood that descriptions of the intrusion detection process correspond to the descriptions of the method embodiments. Therefore, for content that is not described in detail, refer to the foregoing method 400. For brevity, details are not described herein again.

The intrusion detection process can be executed by the intrusion module 300. The intrusion module 300 is applicable between the perception module 220 and the planning module 230. FIG. 5 depicts an overall process. The intrusion detection method includes the following steps.

S510, receive raw point cloud from LiDAR and the perception result from the perception module 230.

That is to say, the perception module 220 does not send the perception result to the planning module 230 as shown in FIG. 1, but sends the perception result to the intrusion detection module 300. The perception result based on the raw point cloud from the LiDAR can be also called the original perception result.

The perception module 220 applies the perception process to the raw point cloud from LiDAR, and returns the perception result.

The raw point cloud include one or more sets of point cloud. One set of point cloud refers to the point cloud of one object. The first point cloud belongs to the raw point cloud.

Correspondingly, the perception result includes one or more object information. For example, the perception result is composed of identified object information as well as uncertain objects. The object information in the original perception result can be also called the original object information. The first object information belongs to the original perception result.

As shown in FIG. 5, one object information can be expressed as (x, y, z, w, h, l, score . . . ).

S520, modify the point cloud (an example of the first point cloud) to obtain the modified point cloud (an example of the second point cloud).

As shown in FIG. 5, the modification unit 310 modifies a set of point cloud to obtain a set of modified point cloud.

For example, the renderer generates a new set of point cloud and passes it to the perception module. The new set of point cloud can be understood as the modified point cloud. The second point cloud belongs to the modified point cloud.

The step S520 includes step S521 to step S523.

S521, the modification unit chooses one of the action from following:

1) Add one or more points.

2) Remove one or more points.

3) Reset previous modifications and add/remove points.

The action option 3) can also be understood as resetting the modification, and then choose one action from the action option 1) and the action option 2).

In other words, the modification unit knows when to reset the point cloud if the modification does not change the result of perception.

S522, the modification unit locates the target 3D position.

The target 3D position refers to the location of the one or more points that would be modified.

For example, the step S521 and the step S522 can be implemented by deep reinforcement.

S523, the modification unit applies the action to the target 3D position.

S530, perceive the modified point cloud to obtain an updated object information (an example of the second object information).

It should be understood that FIG. 5 only takes the point cloud recognition by the perception unit 330 in the intrusion detection module 300 as an example for illustration. In practical applications, the intrusion detection module 300 can have the access to the perception module 220 to perceive the modified point cloud.

For example, the perception module 220 re-perceives the slightly modified point cloud, which means the perception process applied to the modified point cloud and the perception process applied to the raw point cloud use the same perception algorithm.

S540, provide the intrusion detection result according to the updated object information and the original object information.

For example, if the object information is classified as an intrusion, that is to say, an intrusion is detected, the intrusion detection module 300 can perform at least one of the following: alert the intrusion or drop the object information.

Dropping the object information can refer to not sending the information of the object added by the attacker to the planning module.

Alerting the intrusion can refer to notifying the planning module the presence of the object removed by the attacker. For example, provide the corrected information of the object removed by the attacker.

Or, alerting the intrusion can refer to notifying the planning module that there is an intrusion.

If the object information is not classified as an intrusion, that is to say, an intrusion is not detected, then the inference unit 340 decides whether a further process is required or not.

If the inference unit 340 classifies the object information as a benign, it forwards original object information to the planning module. If the inference unit 340 decides a further process is required, that is to say, the object is undecidable, the inference unit 340 can notify the modification unit 310 to apply a further modification process, and then the step S520 to S540 would be repeated.

For each object recognized by the perception module, the detection module can identify whether an attacker intentionally modifies the object or not. For brevity, only one object is used as an example in step S520 to S540.

In the technical solutions provided by the embodiments of the present disclosure, the adversarial attack could be identified by comparing the original object information and the modified object information. In other words, the abnormal of the point cloud due to the attacker could be identified. Therefore, the method in this embodiment of the present disclosure could improve the reliability of object detection and is beneficial to provide more accurate perception results for subsequent control strategies. For example, when the method 400 is applied to the autonomous driving system, the safety of the driving and the user experience could be improved.

In addition, the technical solutions provided by the present disclosure could detect the intrusion in the unit of object point cloud instead of each point. In other words, the technical solutions could work on each object region one by one, instead of detecting the entire point cloud. The technical solutions targets object regions, so that it is faster than analyzing the whole points on the scene.

It should be understood that the technical solutions of the present disclosure may be applied to various electronic devices, such as robot, unmanned aerial vehicle and virtual/augmented reality devices, but the present disclosure are not limited thereto.

The foregoing describes the method embodiments of this disclosure, and the following describes apparatus embodiments corresponding to the foregoing method embodiments. It should be understood that descriptions of the apparatus embodiments correspond to the descriptions of the method embodiments. Therefore, for content that is not described in detail, refer to the foregoing method embodiments. For brevity, details are not described herein again.

Figure 6:
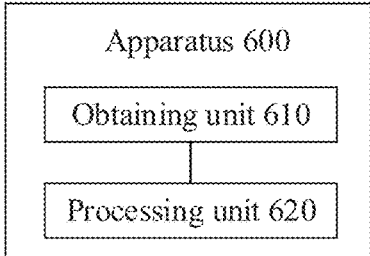
FIG. 6 is a schematic block diagram of an intrusion detection apparatus according to an embodiment.

As shown in FIG. 6, an embodiment of this disclosure provides an intrusion detection apparatus 600.

The intrusion detection apparatus 600 includes the following units.

An obtaining unit 610, configured to: obtain a first point cloud from a LiDAR sensor; and obtain a first object information by applying a first perception process to the first point cloud.

A processing unit 620, configured to modify the first point cloud to obtain a second point cloud.

The obtaining unit 610 is further configured to: obtain a second object information by applying a second perception process to the second point cloud.

The processing unit 620 is further configured to provide an intrusion result based on a comparison between the first object information and the second object information.

Optionally, in some embodiments, the processing unit 620 is specifically configured to add one or more points to the first point cloud, or remove one or more points from the first point cloud.

Optionally, in some embodiments, the processing unit 620 is further configured to locate the one or more points by deep reinforcement learning.

Optionally, in some embodiments, the processing unit 620 is specifically configured to: classify the first object information as an intrusion when the comparison between the first object information and the second object information is equal to or more than a first threshold.

Optionally, in some embodiments, the processing unit 620 is further configured to perform at least one of the following: dropping the first object information, or forwarding a corrected object information to a planning module, wherein the corrected object information is obtained based on the second object information.

Optionally, in some embodiments, the processing unit 620 is specifically configured to: classify the first object information as a benign when the comparison between the first object information and the second object information is less than the first threshold.

Optionally, in some embodiments, the processing unit 620 is further configured to: forward the first object information to a planning module.

Figure 7:
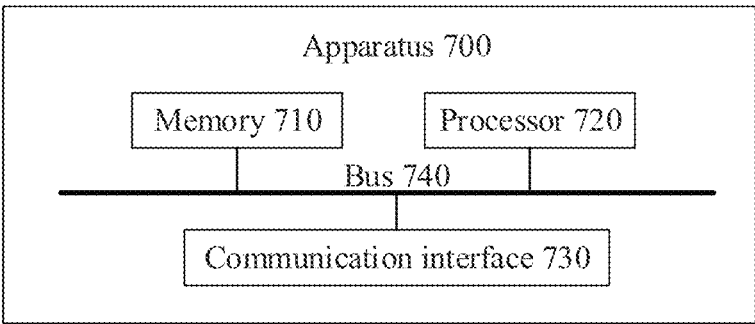
FIG. 7 is a schematic block diagram of an intrusion detection apparatus according to another embodiment.

As shown in FIG. 7, an embodiment of this disclosure further provides an intrusion detection apparatus 700.

The apparatus 700 includes at least one processor 720 and a communication interface 730.

Optionally, the apparatus 700 may further include at least one of the memory 710 and the bus 740. Any two items of the memory 710, the processor 720, and the communication interface 730 or all three items can be connected to each other through the bus 740.

Optionally, the memory 710 may be a read only memory (ROM), a static storage device, a dynamic storage device, or a random access memory (RAM). The memory 710 may store a program. When the program stored in the memory 710 is executed by the processor 720, the processor 720 and the communication interface 730 are used to execute each step of the intrusion detection method of the embodiment of the present disclosure. In other words, the processor 720 may obtain the stored instructions from the memory 710 through the communication interface 730 to execute each step of the intrusion detection method of the embodiment of the present disclosure.

Optionally, the processor 720 may adopt a general-purpose central processing unit (CPU), a microprocessor, an application-specific integrated circuit (ASIC), a graphics processing unit (GPU) or one or more integrated circuits for executing related programs to implement the functions that the units in the apparatus need to perform, or perform each step of the intrusion detection method of the embodiment of the present disclosure.

Optionally, the processor 720 may also be an integrated circuit chip with signal processing capability. In the implementation process, each step of the intrusion detection method of the embodiment of the present disclosure can be completed by an integrated logic circuit of hardware in the processor or instructions in the form of software.

Optionally, the processor 720 may also be a general-purpose processor, a digital signal processor (DSP), an ASIC, a ready-made field-programmable gate array (FPGA) or other programming logic devices, discrete gates or transistor logic devices, discrete hardware components. The methods, steps, and logical block diagrams disclosed in the present disclosure can be implemented or executed. The general-purpose processor may be a microprocessor or the processor may also be any conventional processor. The steps of the method disclosed in the present disclosure may be directly embodied as being executed and completed by a hardware decoding processor, or executed and completed by a combination of hardware and software modules in the decoding processor. The software module can be located in a mature storage medium in the field, such as random access memory, flash memory, read-only memory, programmable read-only memory, or electrically erasable programmable memory, registers. The storage medium is located in the memory, and the processor reads the information in the memory, and combines its hardware to complete the functions required by the units included in the intrusion detection apparatus of the embodiment of the disclosure, or execute each of the intrusion detection methods of the embodiment of the disclosure.

Optionally, the communication interface 730 may use a transceiver device such as but not limited to a transceiver to implement communication between the apparatus and other devices or a communication network. For example, the communication interface 730 may also be an interface circuit.

The bus 740 may include a path for transferring information between various components of the apparatus (for example, a memory, a processor, and a communication interface).

An embodiment of the present disclosure further provides a computer program product that includes an instruction. When the instruction is run on a computer, the computer is enabled to perform the method in the foregoing method embodiment.

An embodiment of the present disclosure further provides a computer readable storage medium, where the computer readable storage medium stores a computer program. When the computer program is executed by a processor, the method in the foregoing method embodiment is implemented.

An embodiment of the present disclosure further provides a chip. The chip includes at least one processor and an interface circuit. At least one processor obtains instructions stored in a memory through the interface circuit, and performs the method in the foregoing method embodiment.

Optionally, the chip may further include a memory in which instructions are stored, and the processor is configured to execute instructions stored on the memory. When the instructions are executed, the processor is configured to perform the method in the foregoing method embodiment.

An embodiment of the present disclosure also provides a terminal. The terminal device includes the intrusion detection apparatus in the foregoing apparatus embodiment, such as the apparatus shown in FIG. 6 or FIG. 7.

Exemplarily, the terminal may be a vehicle, a robot, or an unmanned aerial vehicle.

The above-mentioned intrusion detection device may be installed on the target vehicle or independent of the target vehicle.

In one optional implementation, the terminal includes a LiDAR sensor.

For explanations and beneficial effects of related content of any of the intrusion detection apparatuses provided above, refer to the corresponding method embodiments provided above, and details are not described herein again.

It should further be understood that the "first", "second", "third", "fourth", and various digital numbers in this specification are merely for differentiation for case of description, and are not intended to limit the scope of the embodiments of the present disclosure.

It should be understood that, the processor in the embodiments of this disclosure may be a CPU, or may be another general-purpose processor, a digital signal processor (DSP), an ASIC, a field programmable gate array (FPGA) or another programmable logic device, a discrete gate or transistor logic device, a discrete hardware component, or the like. The general-purpose processor may be a microprocessor, or may be any conventional processor or the like.

It may be understood that the memory mentioned in the embodiments of this disclosure may be a volatile memory or a nonvolatile memory, or may include both a volatile memory and a nonvolatile memory. The nonvolatile memory may be a read-only memory (ROM), a programmable ROM (PROM), an PROM (EPROM), an electrically erasable PROM (EEPROM), or a flash memory. The volatile memory may be a random-access memory (RAM) that is used as an external cache. Through example but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct Rambus RAM (DR RAM).

It should be noted that when the processor is a general-purpose processor, a DSP, an ASIC, an FPGA or another programmable logic device, a discrete gate or a transistor logic device, or a discrete hardware component, the memory (storage module) is integrated into the processor.

It should be noted that the memory described in this specification is intended to include but is not limited to these memories and any memory of another proper type.

A person of ordinary skill in the art may be aware that, with reference to the examples described in the embodiments disclosed in this specification, units and algorithm steps may be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing systems, apparatuses, and units, refer to a corresponding process in the foregoing method embodiments, and details are not described herein again.

In the several embodiments provided in this disclosure, it should be understood that the disclosed systems, apparatuses, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, to be specific, may be located at one position, or may be distributed on a plurality of network units. Some or all of the units may be selected based on actual requirements to achieve the objectives of the solutions of the embodiments.

In addition, function units in the embodiments of this disclosure may be integrated into one processing unit, or each of the units may exist alone physically, or two or more units may be integrated into one unit.

When implemented in a form of a software function unit and sold or used as an independent product, the functions may be stored in a computer-readable storage medium. Based on such an understanding, the technical solutions of this disclosure may be implemented in a form of a software product. The software product is stored in a storage medium, and includes several instructions for instructing a computer device (which may be a personal computer, a server, or a network device) to perform all or some of the steps of the method described in the embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An intrusion detection method, comprising:
   obtaining a first point cloud of an object from a light detection and ranging (LiDAR) sensor;
   obtaining first object information regarding the object by applying a first perception process to the first point cloud, wherein the first object information comprises a confidence score indicating a probability that the object is accurately recognized;
   modifying the first point cloud to obtain a second point cloud of the object;
   obtaining second object information regarding the object by applying a second perception process to the second point cloud, wherein the second object information comprises a confidence score indicating a probability that the object is accurately recognized;

making a comparison between the first object information and the second object information and an object information threshold; and providing an intrusion result based on the comparison between the first object information and the second object information being equal to or greater than the object information threshold.

2. The intrusion detection method of claim 1, wherein modifying the first point cloud to obtain the second point cloud comprises adding one or more points to the first point cloud.

3. The intrusion detection method of claim 2, further comprising locating the one or more points by deep reinforcement learning.

4. The intrusion detection method of claim 1, further comprising:

classifying the first object information as an intrusion when the comparison between the first object information and the second object information is equal to or greater than the object information threshold; or classifying the first object information as benign when the comparison between the first object information and the second object information is less than the object information threshold.

5. The intrusion detection method of claim 4, further comprising dropping the first object information.

6. The intrusion detection method of claim 1, further comprising forwarding the first object information to a planning module.

7. The intrusion detection method of claim 1, wherein the first object information and the second object information each comprise a location of the object.

8. An intrusion detection apparatus, comprising:

one or more memories configured to store programming instructions; and at least one processor coupled to the one or more memories and configured to execute the programming instructions to cause the apparatus to:

obtain a first point cloud of an object from a light detection and ranging (LiDAR) sensor;

obtain a first object information regarding the object by applying a first perception process to the first point cloud, wherein the first object information comprises a confidence score indicating a probability that the object is accurately recognized;

modify the first point cloud to obtain a second point cloud of the object;

obtain a second object information regarding the object by applying a second perception process to the second point cloud, wherein the second object information comprises a confidence score indicating a probability that the object is accurately recognized;

make a comparison between the first object information and the second object information and an object information threshold; and provide an intrusion result based on the comparison between the first object information and the second object information being equal to or greater than the object information threshold.

9. The intrusion detection apparatus of claim 8, wherein the at least one processor is further configured to execute the programming instructions to cause the apparatus to remove one or more points from the first point cloud.

10. The intrusion detection apparatus of claim 9, wherein the at least one processor is further configured to execute the programming instructions to cause the apparatus to locate the one or more points by deep reinforcement learning.

11. The intrusion detection apparatus of claim 8 wherein the at least one processor is further configured to execute the programming instructions to cause the apparatus to:

classify the first object information as an intrusion when the comparison between the first object information and the second object information is equal to or greater than the object information threshold.

12. The intrusion detection apparatus of claim 11, wherein the at least one processor is further configured to execute the programming instructions to cause the apparatus to forward a corrected object information to a planning module, wherein the corrected object information is based on the second object information.

13. The intrusion detection apparatus of claim 8, wherein the at least one processor is further configured to execute the programming instructions to cause the apparatus to forward the first object information to a planning module.

14. The intrusion detection apparatus of claim 8, wherein the first object information and the second object information each comprise a volume of the object.

15. A computer program product comprising instructions stored on a non-transitory medium that, when executed by one or more a processors, cause an apparatus to:

obtain a first point cloud of an object from a light detection and ranging (LiDAR) sensor;

obtain a first object information regarding the object by applying a first perception process to the first point cloud, wherein the first object information comprises a confidence score indicating a probability that the object is accurately recognized;

modify the first point cloud to obtain a second point cloud of the object;

obtain a second object information regarding the object by applying a second perception process to the second point cloud, wherein the second object information comprises a confidence score indicating a probability that the object is accurately recognized;

make a comparison between the first object information and the second object information and an object information threshold; and provide an intrusion result based on the comparison between the first object information and the second object information being equal to or greater than the object information threshold.

16. The computer program product of claim 15, wherein the instructions, when executed by the one or more processors further cause the apparatus to modify the first point cloud to obtain the second point cloud by:

adding one or more points to the first point cloud, or removing one or more points from the first point cloud.

17. The computer program product of claim 16, wherein the instructions, when executed by the one or more processors, further cause the apparatus to locate the one or more points by deep reinforcement learning.

18. The computer program product of claim 15, wherein the instructions, when executed by the one or more processors, further cause the apparatus to perform at least one of:

drop the first object information, or forward a corrected object information to a planning module, wherein the corrected object information is based on the second object information.

19. The computer program product of claim 15, wherein the instructions, when executed by the one or more processors, further cause the apparatus to provide an intrusion result based on a comparison between the first object information and the second object information by classifying the first object information as benign when the comparison between the first object information and the second object information is less than the object information threshold.

\* \* \* \* \*